United States Patent
Horng et al.

(10) Patent No.: US 6,828,748 B2
(45) Date of Patent: Dec. 7, 2004

(54) SPEED CONTROL CIRCUIT FOR A BRUSHLESS DC MOTOR

(75) Inventors: Alex Horng, Kaohsiung (TW); Ta-Lun Ko, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/445,920

(22) Filed: May 28, 2003

(65) Prior Publication Data

US 2004/0165869 A1 Aug. 26, 2004

(30) Foreign Application Priority Data

Feb. 24, 2003 (TW) ..................... 92202959 U

(51) Int. Cl.$^7$ .............................................. G05B 11/28
(52) U.S. Cl. ................ 318/599; 318/138; 318/439; 318/254; 388/825; 388/829; 388/831
(58) Field of Search ................... 318/254, 138, 318/439, 599; 388/825, 829, 831, 907 S

(56) References Cited

U.S. PATENT DOCUMENTS

| | | | | |
|---|---|---|---|---|
| 4,359,674 A | * | 11/1982 | Gotou | 318/254 |
| 4,700,116 A | * | 10/1987 | Inoue et al. | 318/254 |
| 5,321,342 A | * | 6/1994 | Kruse | 318/254 |
| 6,008,603 A | * | 12/1999 | Jones et al. | 318/254 |
| 6,188,187 B1 | * | 2/2001 | Harlan | 318/254 |
| 6,396,238 B1 | | 5/2002 | Miyahara | |
| 6,703,803 B2 | * | 3/2004 | Ohiwa et al. | 318/138 |
| 2002/0057069 A1 | | 5/2002 | Kushida | |
| 2002/0197068 A1 | | 12/2002 | Xi | |

* cited by examiner

Primary Examiner—Rina Duda
(74) Attorney, Agent, or Firm—Bacon & Thomas, PLLC

(57) ABSTRACT

A speed control circuit for a brushless dc motor includes a motor drive circuit, a drive member and a PWM control circuit. The motor drive circuit includes at least one coil and at least one transistor serially connected to the coil. The drive member is provided with a plurality of output terminals adapted to output a driving signal to the transistor of the motor drive circuit. The PWM control circuit is in connection between the transistor of the motor drive circuit and the output terminal of the drive member, thereby turning the transistor on or off.

4 Claims, 3 Drawing Sheets

SPEED CONTROL CIRCUIT FOR A BRUSHLESS DC MOTOR

BACKGROUND OF THE INVENTION

1. Field of the Invention

The present invention is related to a speed control circuit for a brushless dc motor. More particularly, the present invention is related to a speed control circuit of pulse-width modulation (PWM).

2. Description of the Related Art

Referring to FIG. 1, a conventional fan having a speed-adjustable drive circuit discloses a current-controlling circuit 1, a PWM drive IC member 2, and a PWM input terminal 3 connected to the current-controlling circuit 1. The current-controlling circuit 1 includes a transistor (Q4) and a resistor (R5). The transistor (Q4) has a collector electrically connected to two emitters of two transistors (Q1, Q2), and an emitter connected to ground. The two transistors (Q1, Q2) have two collectors serially connected to two coils (V1, V2) respectively. Inputting a PWM signal, it can turn on or off a base of the transistor (Q4), thereby controlling to actuate or cut off the coils (V1, V2) alternatively.

The PWM drive IC member 2 is adapted to electrically connect to two bases of the two transistors (Q1, Q2), thereby controlling to turn on or off the two transistors (Q1, Q2) alternatively. Then, each of the two transistors (Q1, Q2) is able to conduct between the collector and the emitter synchronously. In operation, a current, which is supplied from a power source, is controlled to pass through the coils (V1, V2) by means of saturation or unsaturation between the collectors and the emitters of the two transistors (Q1, Q2). Thus, the coils (V1, V2) are alternatively controlled to allow passage of a current of a power source according to frequency of the PWM signal.

However, during controlling speed of the motor, the transistor Q4 must allow and bear a passage of a huge current that may be passed through the coils (V1, V2) or cut off. And thus there is a need for using a big transistor. Consequently, it may increase manufacture cost of the fan. Moreover, it results in a destruction of overheating the transistor Q4 after a long-term successive operation by high on/off frequency of the huge current from the power source controlled under a PWM signal. Consequently, it may shorten useful life of the fan.

Furthermore, the speed-adjustable drive circuit must employ an expensive semiconductor component of the PWM drive IC member 2 that may increase manufacture cost.

The present invention intends to provide a speed control circuit for a brushless dc motor having a PWM control circuit connected between plural output terminates of a drive member and plural transistors of a motor drive circuit. The PWM control circuit is adapted to employ PWM signals for simply controlling driving signals generated from the drive member that is in control of turning on or off a transistor of the motor drive circuit in such a way to mitigate and overcome the above problem.

SUMMARY OF THE INVENTION

The primary objective of this invention is to provide a speed control circuit for a brushless dc motor having a PWM control circuit connected between plural output terminates of a drive member and plural transistors of a motor drive circuit. The PWM control circuit is adapted to control driving signals generated from the drive member by employing PWM signals so that a transistor of the motor drive circuit may be turned on or off. Thereby, it may prolong useful life of the motor.

The secondary objective of this invention is to provide a speed control circuit for a brushless dc motor having a PWM control circuit connected between plural output terminals of a drive member and plural transistors of a motor drive circuit. Use of the PWM control circuit to only control the driving signal of the drive member results in low manufacture cost, and the PWM control circuit has compatibility with the original motor drive circuit. Thereby, it may reduce manufacture cost of the motor.

The speed control circuit for a brushless dc motor in accordance with the present invention comprises a motor drive circuit, a drive member and a PWM control circuit. The motor drive circuit includes at least one coil and at least one transistor serially connected to the coil. The drive member is provided with a plurality of output terminals adapted to output a driving signal to the transistor of the motor drive circuit. The PWM control circuit is in connection between the transistor of the motor drive circuit and the output terminal of the drive member, thereby turning the transistor on or off.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
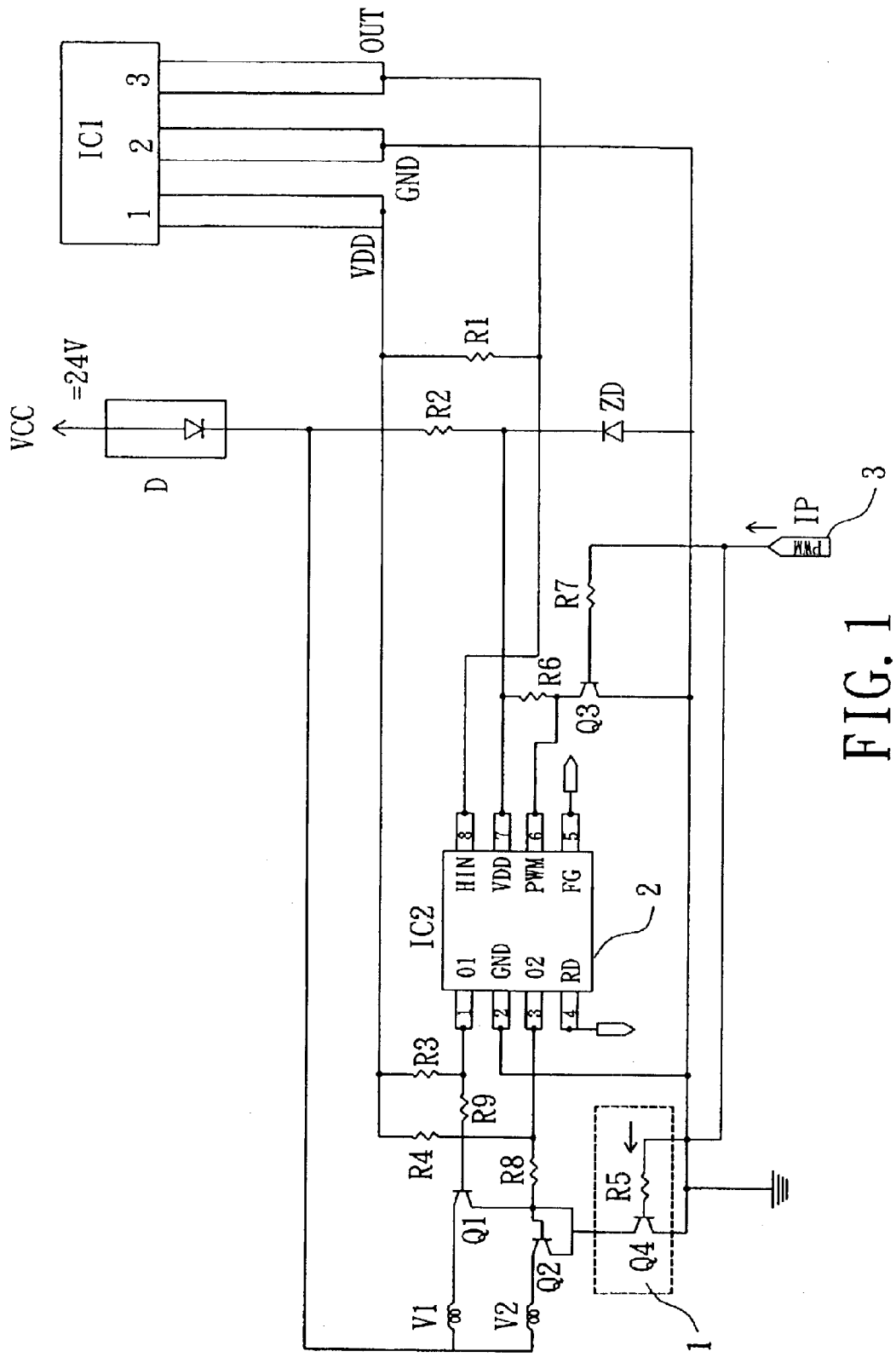
FIG. 1 is a schematic diagram of a conventional speed-adjustable drive circuit for a fan in accordance with prior art.

Referring now to the drawings, there are two embodiments of the present invention shown therein, which include generally a motor drive circuit member and a PWM control circuit member.

Figure 2:
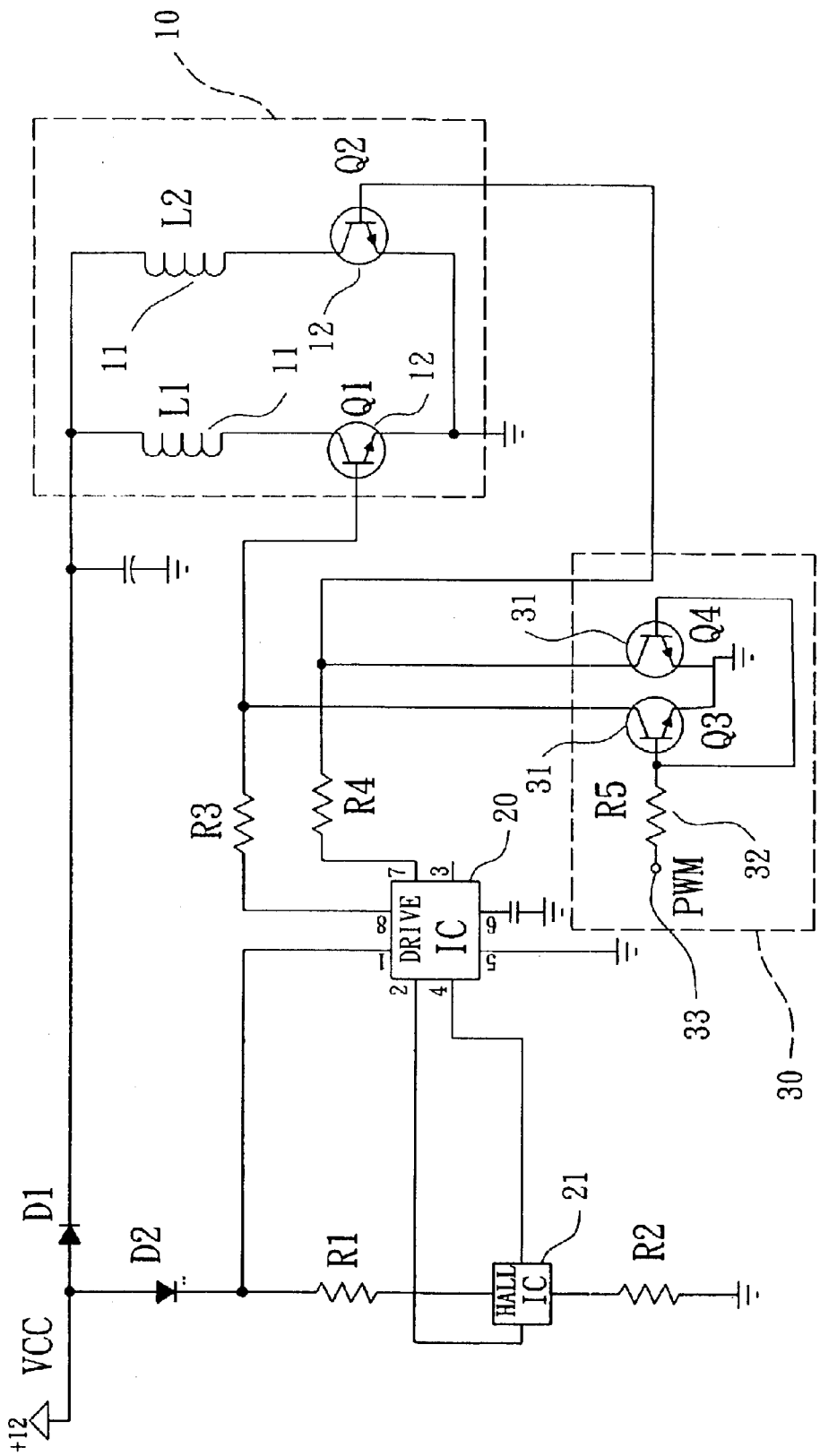
FIG. 2 is a schematic diagram of a speed control circuit for a brushless dc motor in accordance with a first embodiment of the present invention.

Referring to FIG. 2, a speed control circuit for a brushless dc motor in accordance with the first embodiment of the present invention includes a motor drive circuit 10, a drive member 20 and a PWM control circuit 30. The motor drive circuit 10 is electrically connected to the drive member 20; and the PWM control circuit 30 is electrically connected between the motor drive circuit 10 and the drive member 20.

Referring again to FIG. 2, the motor drive circuit 10 has a common drive circuitry. An input terminal of the motor drive circuit 10 is electrically connected to a power source Vcc. The motor drive circuit 10 includes at least one coil 11 and at least one transistor 12. The transistor 12 has a first end connected to the coil 11, and a second end connected to ground. The motor drive circuit 10 is a double phase drive circuit. A current may pass through the two coils 11 which generate an alternative magnetic field when the two transistor 12 is turned on and off in turn.

Referring again to FIG. 2, the drive member 20 is a common drive member and has a plurality of input terminals connected to an output terminal of a Hall element 21 for receiving Hall signals. Also, the drive member 20 further has a plurality of output terminals, such as pins 7 and 8, adapted to send driving signals to a base of the transistor 12 of the motor drive circuit 10. The drive member 20 is able to control turning on or off the transistor 12. Preferably, the drive member 20 and the Hall element 21 are common IC members.

Referring again to FIG. 2, the PWM control circuit is electrically connected between the output terminals of the drive member 20 and the transistor 12 of the motor drive circuit 10. The PWM control circuit 30 essentially consists of a pair of transistors 31, a resistor 32 and a PWM input terminal 33. The resistor 32 is connected between the PWM input terminal 33 and bases of the transistors 31. Each collector of the transistors 31 is connected to the drive member 20 while each emitter of the transistors 31 is connected to ground.

In manufacture, there is a permission for a control circuit in low manufacture cost since the PWM control circuit 30 is only used to control driving signals generated from the drive member 20. Consequently, there is a need for a small transistor 31 in the PWM control circuit 30 with low manufacture cost.

In operation, a PWM signal may be sent to the PWM input terminal 33 and to the bases of the transistors 31 for turning it on or off. Turning on or off the transistor 31, the PWM signal may control the driving signals generated from the drive member 20 for sending to the motor drive circuit 10.

When the transistors 31 are turned on synchronously, all of the driving signals generated from the pins 7 and 8 of the drive member 20 are passed through the transistors 31 and discharged to ground. Namely, all of the driving signals generated from the drive member 20 are cut off for turning off the transistor 12 of the motor drive circuit 10, thereby terminating the current of the coil 11.

Alternatively, when the transistors 31 are turned off synchronously, the driving signals generated from the drive member 20 are resent to the bases of the transistors 12 of the motor drive circuit 10. Then, the transistors 12 are turned on or off in turn and thus the currents of the coils 11 are actuated alternatively.

Referring again to FIG. 2, PWM signals may pass through the PWM input terminal 33 to control the driving signals of the drive member 20 so that the speed of the motor is adjustable. By use such a PWM signal, it is a common technique in the art for adjusting motor speed and the detailed descriptions are omitted.

Referring again to FIGS. 1 and 2, the transistor Q4 of the conventional current-controlling circuit 1 must bear a passage of a huge current and thus employ a big transistor that may increase manufacture cost. Moreover, the transistor Q4 may be destroyed due to overheating in a long-term successive operation of the huge current from the power source controlled under a PWM signal. By contrast, the transistor 31 of the speed control circuit 30 of the present invention employs a relatively small transistor that may reduce manufacture cost and prolong useful life.

The conventional current-controlling circuit 1 must employ an additional, expensive component, such as a PWM drive IC member, and it may cause an increase of manufacture cost. However, the speed control circuit of the present invention employs original motor components, such as a drive member, and it may further reduce manufacture cost.

Figure 3:
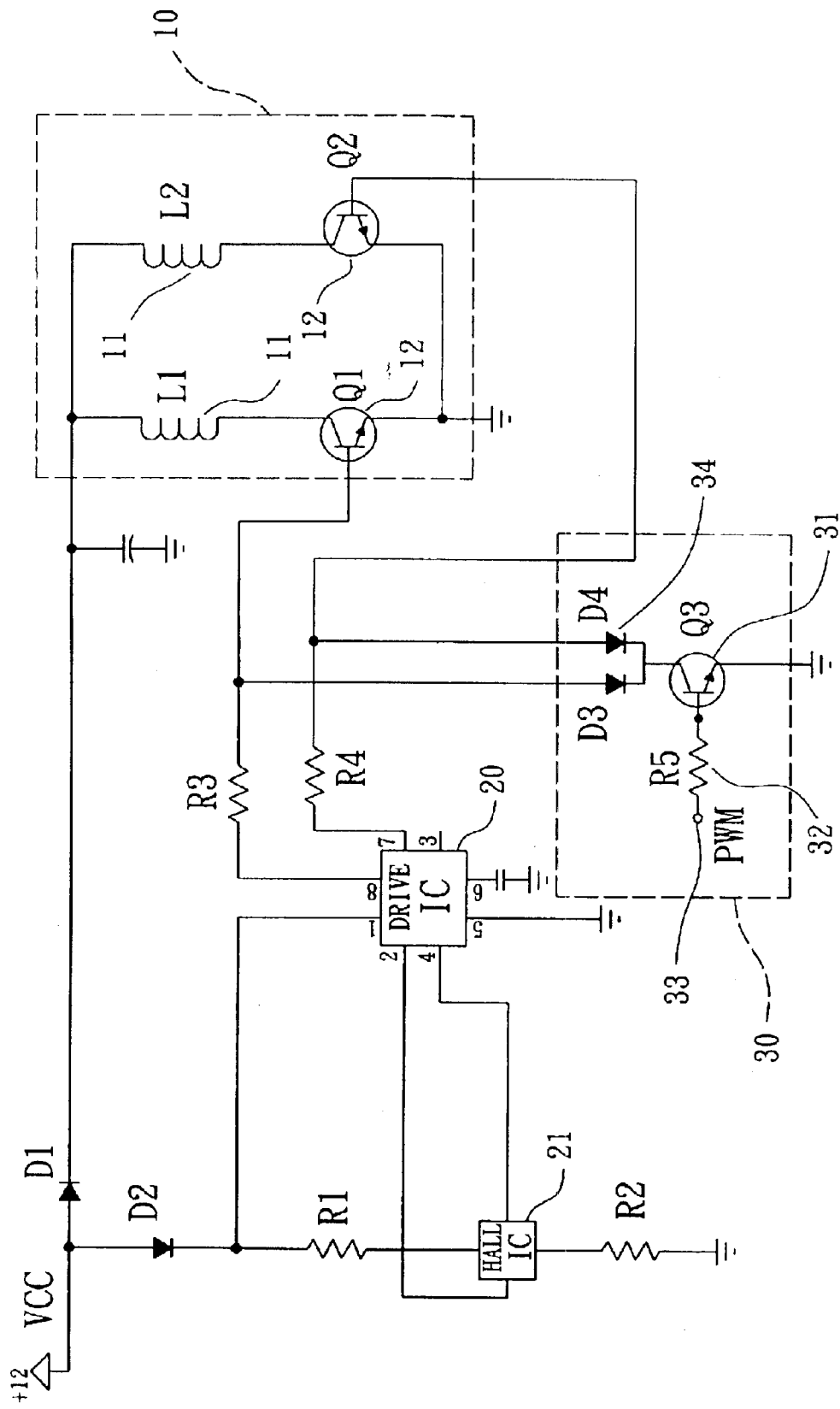
FIG. 3 is a schematic diagram of a speed control circuit for a brushless dc motor in accordance with a second embodiment of the present invention.

Referring to FIG. 3, reference numerals of the second embodiment has applied the identical numerals of the first embodiment. The speed control circuit of the second embodiment has the similar configuration and same function as that of the first embodiment and the detailed descriptions are omitted.

Referring again to FIG. 3, a speed control circuit for a brushless dc motor in accordance with the second embodiment of the present invention includes a motor drive circuit 10, a drive member 20 and a PWM control circuit 30. In comparison with the first embodiment, the PWM control circuit 30 is essentially consisted of a transistors 31, a resistor 32, a PWM input terminal 33 and a pair of diodes 34. The diodes 34 is adapted to pass current or driving signals in only one direction so that the driving signal generated from the drive member 20 is discharged through the diodes 34. Each anode of the diodes 34 is electrically connected to the output terminal of the drive member 20 while each cathode of the diodes 34 commonly connecting to the collector of the transistor 31. Meanwhile, an emitter of the transistor 31 has ground connection.

When the transistor 31 is turned on, all of the driving signals generated from the drive member 20 are passed through the diodes 34 and the transistor 31 successively, and discharged to ground. The transistor 12 of the motor drive circuit 10 is turned off, thereby terminating the current of the coil 11.

Alternatively, when the transistor 31 is turned off, the driving signals generated from the drive member 20 are resent to the bases of the transistors 12 of the motor drive circuit 10. The transistors 12 are turned on or off in turn and thus the currents of the coils 11 are actuated alternatively.

Like the first embodiment, the speed control circuit for a brushless dc motor of the second embodiment also has advantages of reducing manufacture cost and prolonging useful life by incorporating the PWM control circuit 30 into the motor drive circuit 10.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A speed control circuit for a brushless dc motor, comprising:
a motor drive circuit including at least one coil adapted to drive the motor, and at least one transistor;
a drive member having a plurality of output terminals adapted to send a driving signal to the transistor of the motor drive circuit for controlling operation; and
a PWM control circuit electrically connected between the output terminals of the drive member and the transistor of the motor drive circuit, thereby adjusting a speed of the motor, said PWM control circuit including a pair of transistors and a PWM input terminal, the PWM input terminal being electrically connected to a base of each of the transistors of the PWM control circuit, a collector of each of the transistors of the PWM control circuit being connected to the output terminals of the drive member, and an emitter of each of the transistors of the PWM control circuit being connected to ground,
wherein when the transistors of the PWM control circuit are turned on, the driving signal of the drive member may be discharged to ground through the transistors of the PWM control circuit, thereby cutting off the at least one transistor of the motor drive circuit to terminate a current passing through the coil of the motor drive circuit.

2. The speed control circuit for a brushless dc motor as defined in claim 1, wherein the motor drive circuit is a double phase drive circuit.

3. A speed control circuit for a brushless dc motor, comprising:
- a motor drive circuit including at least one coil adapted to drive the motor, and at least one transistor;
- a drive member having a plurality of output terminals adapted to send a driving signal to the transistor of the motor drive circuit for controlling operation; and
- a PWM control circuit electrically connected between the output terminals of the drive member and the transistor of the motor drive circuit, thereby adjusting a speed of the motor, said PWM control circuit including a transistor, a PWM input terminal and a pair of diodes; an anode of each of the diodes being electrically connected to the output terminals of the drive member and a cathode of each of the diodes being electrically connected to a collector of the transistor; and an emitter of the transistor being connected to ground; wherein when the transistor of the PWM control circuit is turned on, the driving signal of the drive member is discharged to ground through the diodes and the transistor of the PWM control circuit so that the transistors of the motor drive circuit are cut off to terminate a current passing through the coil of the motor drive circuit.

4. The speed control circuit for a brushless dc motor as defined in claim 3, wherein the motor drive circuit is a double phase drive circuit.

* * * * *